(12) United States Patent
Hong et al.

(10) Patent No.: US 11,307,107 B2
(45) Date of Patent: Apr. 19, 2022

(54) POWER TRANSMISSION APPARATUS CAPABLE OF MEASURING TORQUE AND POWER GENERATION APPARATUS USING THE SAME

(71) Applicant: MICROAUTOMATION CO., LTD., Daejeon (KR)

(72) Inventors: Yoon Shik Hong, Daejeon (KR); Han Jong Ju, Daejeon (KR); Sung Nam Oh, Seoul (KR); Hyun Soo Park, Daejeon (KR)

(73) Assignee: MICROAUTOMATION CO., LTD., Daejeon (KR)

( * ) Notice: Subject to any disclaimer, the term of this patent is extended or adjusted under 35 U.S.C. 154(b) by 279 days.

(21) Appl. No.: 15/927,488

(22) Filed: Mar. 21, 2018

(65) Prior Publication Data
US 2018/0364118 A1 Dec. 20, 2018

(30) Foreign Application Priority Data
Jun. 19, 2017 (KR) .......................... 10-2017-0077204

(51) Int. Cl.
*G01L 5/00* (2006.01)
*G01L 3/14* (2006.01)
*G01L 1/22* (2006.01)

(52) U.S. Cl.
CPC .......... *G01L 5/0042* (2013.01); *G01L 1/2206* (2013.01); *G01L 3/1428* (2013.01); *G01L 3/1457* (2013.01)

(58) Field of Classification Search
CPC ... G01L 5/0042; G01L 1/2206; G01L 3/1428; G01L 3/1435; G01L 3/1442; G01L 3/145; G01L 3/1457; G01L 3/1492
See application file for complete search history.

(56) References Cited

U.S. PATENT DOCUMENTS

| | | | | |
|---|---|---|---|---|
| 4,723,450 A | * | 2/1988 | Coulter | G01L 3/1428 73/862.191 |
| 6,439,065 B1 | * | 8/2002 | Ooshima | B60L 50/52 73/862.326 |
| 7,682,287 B1 | * | 3/2010 | Hsieh | A63B 21/00196 482/1 |
| 8,726,741 B2 | * | 5/2014 | Krippner | G01L 3/1457 73/862.045 |
| 9,453,839 B2 | * | 9/2016 | Abi-Samra | B01L 3/502746 |
| 9,833,662 B2 | * | 12/2017 | Potter | A63B 21/002 |
| 10,401,245 B2 | * | 9/2019 | Li | G01L 5/162 |

FOREIGN PATENT DOCUMENTS

WO   WO-03023345 A1 * 3/2003 ............. G01L 5/221

* cited by examiner

*Primary Examiner* — Justin N Olamit
(74) *Attorney, Agent, or Firm* — United One Law Group LLC; Kongsik Kim; Jhongwoo Peck

(57) ABSTRACT

The present invention relates to a power transmission apparatus capable of measuring torque and a power generation apparatus using the same, and more particularly, to a power transmission apparatus capable of measuring torque and a power generation apparatus using the same which includes a disk-shaped outer body that receives power from the outside, an inner body that is coupled to the inside of the outer body, and at least one load cell formed between the outer body and the inner body.

7 Claims, 5 Drawing Sheets

POWER TRANSMISSION APPARATUS CAPABLE OF MEASURING TORQUE AND POWER GENERATION APPARATUS USING THE SAME

CROSS-REFERENCE TO RELATED APPLICATION

This application claims under 35 U.S.C. § 119(a) the benefit of Korean Patent Application No. 10-2017-0077204 filed on Jun. 19, 2017, which is incorporated herein by reference.

TECHNICAL FIELD

The present invention relates to a power transmission apparatus capable of measuring torque and a power generation apparatus using the same and more particularly, to a power transmission apparatus that transmits torque constituted to measure the torque inside a mechanical apparatus where rotational motion exists and a power generation apparatus using the power transmission apparatus capable of measuring the torque.

BACKGROUND ART

Generally, a technology of measuring torque is a technology of measuring the strain for the torsion of a shaft by a strain gauge to transmit the strain as an analogue or digital signal and various conditions of the apparatus may be effectively and precisely controlled and managed by using the technology.

On the other hand, a general torque sensor representatively includes a non-rotary (fixing) type torque sensor which detects a constant resistance moment shown in the non-rotary shaft side by the strain gauge and then transmits an analogue or digital signal to the outside through a signal transmission means when a constant torsion or load is applied to a driver or a loader at the other side while one shaft to which a strain gauge is attached gives a non-rotary (fixing) condition and a rotational torque sensor that measures a predetermined resistance moment shown therebetween and then transmits an analogue or digital signal to the outside through a contact signal transmission means or a non-contact signal transmission means when a constant load is applied to one driver while a flexible condition capable of rotating both one shaft to which the strain gauge is attached and the other shaft which is the driver or the loader is given.

However, in the non-rotary (fixing) type torque sensor described above, since the strain gauge is attached to the fixing shaft on one non-rotary side, when a signal detected by the strain gauge is transmitted to the outside, only a signal connection line is simply connected, and thus, there is a useful advantage that the configuration is very simple and can be manufactured at an extremely low cost. However, there is a large disadvantage that is practically impossible to apply the non-rotary (fixing) type torque sensor to various high-speed rotating machines and the like that require rotary movement in both shafts due to non-rotary or fixed type, and thus there is a limit in a use range thereof.

On the other hand, in the case of the rotary torque sensor (contact or non-contact type), there is a considerable advantage in that the rotary torque sensor can be freely used in various high-speed rotating machines and the like that require rotary movement in both shafts. However, since the strain gauge is attached to any one of the rotary shafts on both sides that are rotated at a constant rotation speed, in order to transmit a detection signal of a torsional moment shown at one shaft during rotating through the strain gauge to the outside, unlike the above-mentioned non-rotary (fixing) type in which a simple line connection is simply possible, a high-priced contact-type signal transmission means or a non-contact type signal transmission means capable of easily transmitting signals to the outside even while both the shafts rotates is required to be additionally provided, and thus, there is a disadvantage in that the configuration becomes complicated and is very expensive.

Further, in the case of the rotary type torque sensor (non-contact type), the rotational motion is possible on both shafts and can be measured at a fixed position. However, since the torque is measured by a magnetic field change due to a magnetic pattern or optical displacement detection, it is expensive.

All of the above-mentioned methods have a disadvantage that a space for only the measuring unit is additionally required to measure the strain of the shaft so that the shaft is elongated.

SUMMARY

In order to solve the aforementioned problems in the related art, an object of the present is to achieve a simple configuration without the need to connect an additional torque sensor to a shaft through a configuration capable of measuring the torque inside a power transmission apparatus which is essential in a mechanical apparatus including a rotational motion, and to minimize distortion of torque values by external forces. Further, the power generation apparatus using the power transmission apparatus for measuring the torque can directly feedback the torque value when generating the torque and can perform comparative control to accurately generate the desired force.

In order to solve the objects, an exemplary embodiment of the present invention provides a power transmission apparatus capable of measuring torque, comprising: a disk-shaped outer body that receives power from the outside or transmits the power to the outside; an inner body that is coupled to the inside of the outer body and receives the power from a shaft or transmits the power to the shaft; and at least one load cell formed between the outer body and the inner body.

In the power transmission apparatus capable of measuring the torque according to the exemplary embodiment of the present invention and a power generation apparatus using the same, the outer body may have any one shape of an outer circumference surface of a teeth shape, a wheel shape, and a link shape.

In the power transmission apparatus capable of measuring the torque according to the exemplary embodiment of the present invention and the power generation apparatus using the same, the outer body may be supported by any one of a sleeve or a bearing in the inner body.

In the power transmission apparatus capable of measuring the torque according to the exemplary embodiment of the present invention and the power generation apparatus using the same, the inner body may include a board formed by an electric circuit for operating the load cell.

In the power transmission apparatus capable of measuring the torque according to the exemplary embodiment of the present invention and the power generation apparatus using the same, the power for operating the load cell and the board may be received from the outside by either a brush using direct contact or a wireless power transmission.

In the power transmission apparatus capable of measuring the torque according to the exemplary embodiment of the present invention and the power generation apparatus using the same, a signal detected from the load cell and the board may be transmitted to the outside by either a brush using direct contact or a wireless power transmission.

Another exemplary embodiment of the present invention provides a power generation apparatus using a power transmission apparatus capable of measuring torque, the power generation apparatus comprising: a housing where the power transmission apparatus capable of measuring the torque is mounted on one side; a pulley which is connected to the outer circumference surface of an outer body of the power transmission apparatus by a timing belt and mounted on the other side of the housing; a shaft of which one side is coupled to a central axis of an inner body of the power transmission apparatus; a drum coupled to the other side of the shaft; a motor connected with the pulley to rotate the pulley; and a controller controlling the motor, in which the power transmission apparatus rotates by the rotation of the pulley.

In the power transmission apparatus capable of measuring the torque according to the exemplary embodiment of the present invention and the power generation apparatus using the same, the drum may include either a flat belt or a cable connected to the outer circumference surface of the drum so as to convert the rotational motion of the shaft into a straight-line motion. In addition, the drum may include a slip ring using a brush inserted to the inside of the drum by the method of transmitting the power and the signal for driving the load cell in the power transmission apparatus capable of measuring the torque.

According to the power transmission apparatus capable of measuring the torque according to the exemplary embodiment of the present invention and the power generation apparatus using the same, the torque is measured by the load cell measuring the torque in the inner body and the board connected to the load cell and thus miniaturization is possible without a separate measuring apparatus.

Further, since the inner body and the outer body transmitting the rotational force are separated from each other and connected to each other only by the load cell, compression or tension of the load cell is not generated with respect to the external force other than the torque so that accurate torque sensing can be realized.

Further, the torque signal can be fed-back to the controller to control the motor so that a desired force can be follow-controlled.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
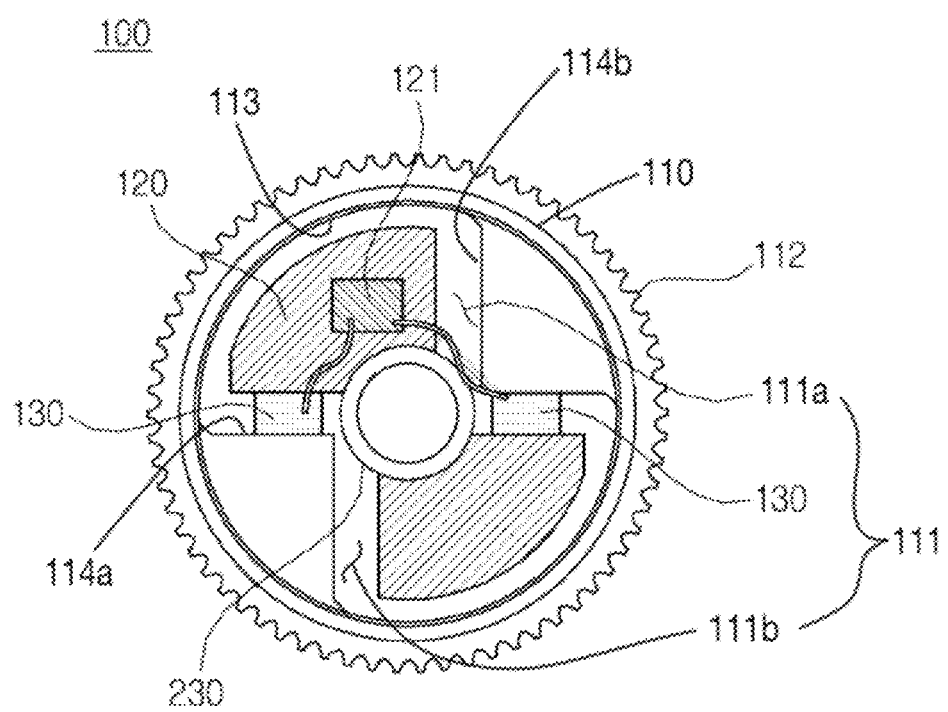
FIG. 1 is a schematic diagram schematically illustrating a power transmission apparatus capable of measuring torque according to an exemplary embodiment of the present invention.

Hereinafter, exemplary embodiments of the present disclosure will be described in detail with reference to the accompanying drawings. First, in denoting reference numerals to constitutional elements of respective drawings, the same elements will be designated by the same reference numerals although they are shown in different drawings. Further, in the following description, a detailed explanation of known related technologies may be omitted to avoid unnecessarily obscuring the subject matter of the present invention.

Throughout this specification, when it is described that an element is "connected (bonded, contacted, and coupled)" to another element, the element may be "directly connected" to the other element or "indirectly connected" with the other element interposed therebetween. Throughout the specification and the claims, unless explicitly described to the contrary, the word "comprise" and variations such as "comprises" or "comprising" will be understood to imply the inclusion of stated elements but not the exclusion of any other elements.

Figure 2:
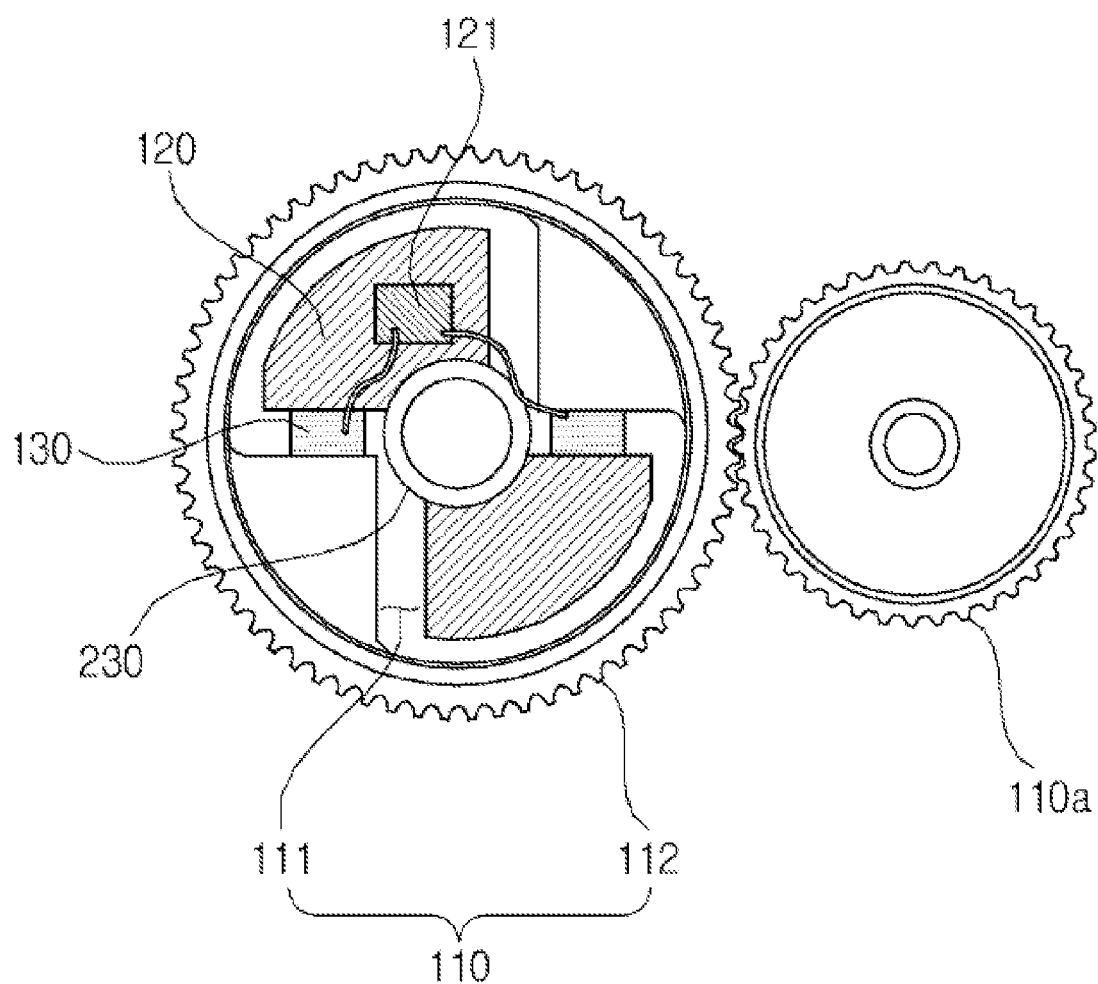
FIG. 2 is an exemplary view illustrating a gear coupled state of FIG. 1.
Figure 3:
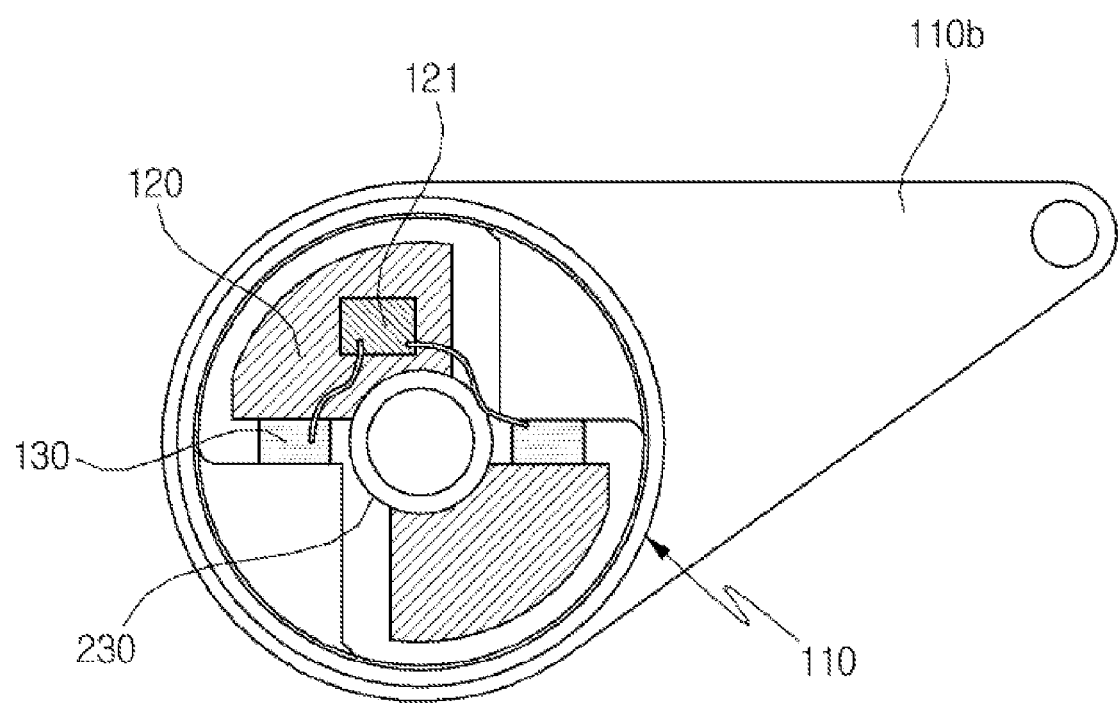
FIG. 3 is an exemplary view illustrating a link coupled state of FIG. 1.
Figure 4:
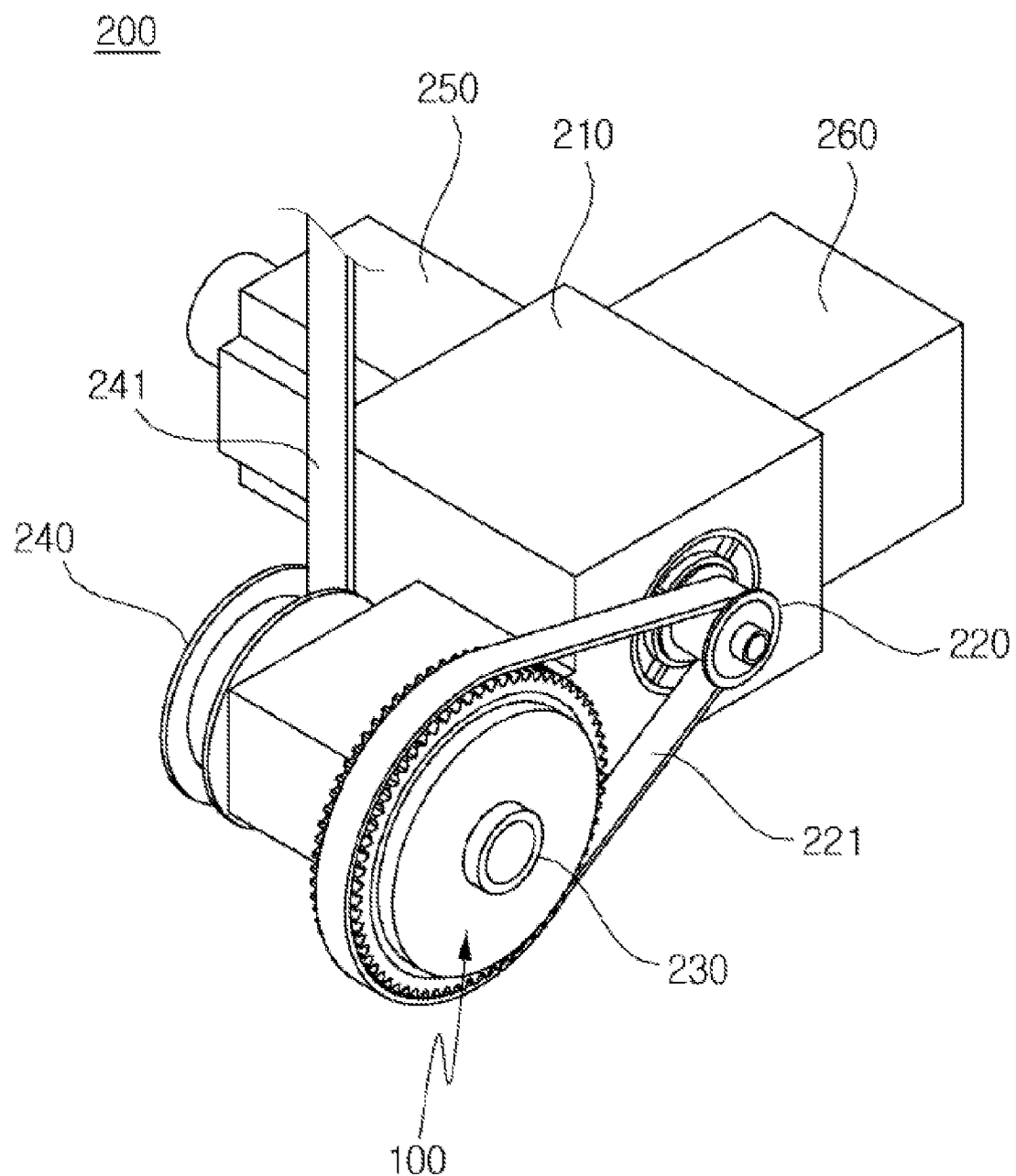
FIG. 4 is a perspective view schematically illustrating a power transmission apparatus capable of measuring torque and a power generation apparatus using the same according to an exemplary embodiment of the present invention.
Figure 5:
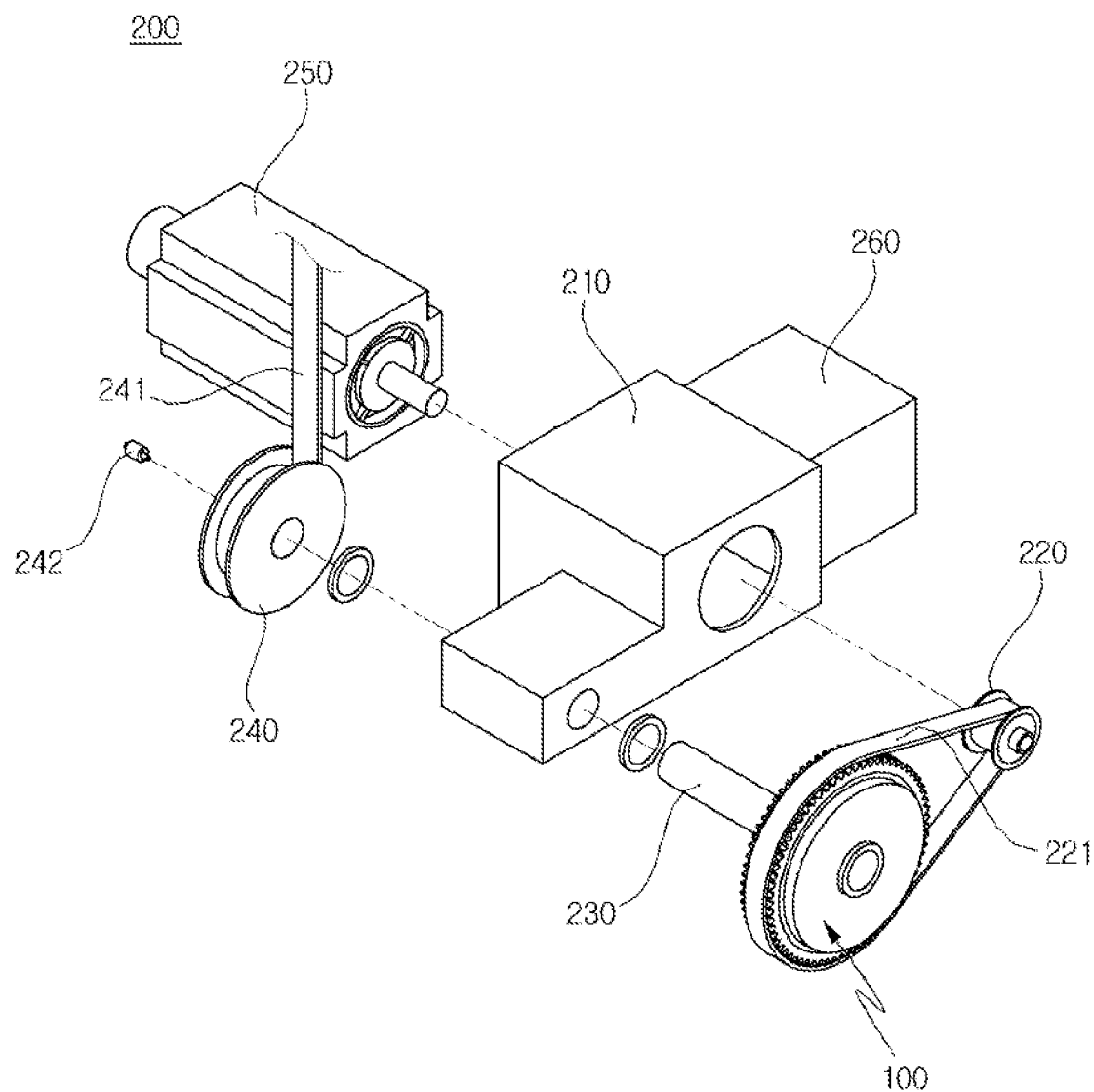
FIG. 5 is an exploded perspective view illustrating an exploded state of FIG. 4.

FIG. 1 is a schematic diagram schematically illustrating a power transmission apparatus capable of measuring torque according to an exemplary embodiment of the present invention, FIG. 2 is an exemplary view illustrating a gear coupled state of FIG. 1, FIG. 3 is an exemplary view illustrating a link coupled state of FIG. 1, FIG. 4 is a perspective view schematically illustrating a power transmission apparatus capable of measuring torque and a power generation apparatus using the same according to an exemplary embodiment of the present invention, and FIG. 5 is an exploded perspective view illustrating an exploded state of FIG. 4.

As illustrated in FIGS. 1 to 3, a power transmission apparatus 100 capable of measuring torque according to an exemplary embodiment of the present invention includes an outer body 110, an inner body 120, a load cell 130, and a board 121.

More particularly, the power transmission apparatus 100 capable of measuring the torque according to the exemplary embodiment of the present invention includes a disk-shaped outer body 110 that receives power from the outside or transmits the power to the outside, an inner body 120 that is coupled to the inside of the outer body and receives the power from a shaft or transmits the power to the shaft, and at least one load cell 130 formed between the outer body and the inner body.

Hereinafter, the power transmission apparatus 100 capable of measuring the torque according to the exemplary embodiment of the present invention will be described in more detail with reference to FIGS. 1 to 3.

The outer body 110 has a disk shape to receive or transmit the torque from the outside and has a predetermined thickness. In addition, the outer body 110 has a space 111 formed on the inside thereof and a shape of an outer circumference surface may be formed by any one of a teeth 112 shape, a wheel shape, or a link shape.

That is, in the outer body 110, the teeth 112 are formed in a groove form along the outer circumferential surface such that a timing belt 221 may be wound around the grooves. In addition, the outer body 110 may have a wheel shape of the outer circumferential surface to transmit or receive the power by friction. In addition, the outer body 110 may have a link 110b shape so that the power can be transmitted by an external machine apparatus.

Meanwhile, the space 111 is formed so that the inner body 120 to be described below is inserted and coupled.

The teeth 112 may be coupled with an external gear 110a. That is, the outer body 110 can receive the torque by the rotation of the gear 110a.

Further, the outer body 110 may be supported by either a sleeve or a bearing in the inner body 120 to minimize the friction force even with a minute relative displacement.

The inner body 120 is coupled to the inside of the outer body 110 to receive or transmit the torque from the shaft and rotates in the same direction as a rotation direction of the outer body 110. In addition, the inner body 120 may be formed in response to the shape of the space 111 to be coupled to the inside of the outer body.

More particularly, as illustrated in FIG. 1, the space 111 is formed through the inside of the outer body 110 and formed as a pair of opposing spatial portions 111a and 111b. That is, as shown in FIG. 1, each of the spatial portions 111a and 111b is defined by the arc 113 of the outer body 110 and two flat surfaces 114a and 114b that emanate from the outer body 110 toward a middle portion of the outer body 110.

Further, the inner body 120 is formed so that the outer circumference surface is spaced apart from the inside of the space 111. This is a space where the load cell 130 to be described below is disposed.

Further, the inner body 120 includes a board 121 formed of an electronic circuit for operating the load cell 130.

Herein, the board 121 has a connection line connected with the load cell 130 and is disposed on one surface of the inner body 120 to sensitively detect the force applied to the load cell 130 while rotating with the inner body 120.

At least one load cell 130 may be formed between the outer body 110 and the inner body 120.

The load cell 130 receives the compression force or the tension when the outer body 110 and the inner body 120 transmit the power to measure a force applied to the load cell 130. More particularly, the load cell 130 is disposed in the space 111 formed at the inside of the outer body 110 and a space formed to be spaced apart from the edge of the inner body 120. In addition, the load cell 130 is disposed to be spaced part from the center of the rotational shaft at a predetermined interval when the power is transmitted between the outer body 110 and the inner body 120 to receive the force transmitting the power as the compression force or the tension. As a result, the torque can be measured by the product of the magnitude of the compression force or the tension applied to the load cell 130 and the distance from the center.

Meanwhile, since the outer body 110 and the inner body 120 are connected to each other by only the load cells 130 while having the same rotational shaft, a force in the other direction other than the torque as the power in the rotational shaft may not generate any compression force or tension in the load cell 130. Therefore, an effect of the load cell 130 on the external force irrelative to the torque is minimized and thus accurate sensing of the torque is possible.

The load cell 130 and the board 121 are included in the outer body 110 and the inner body 120 which rotate together and thus need to receive the power from the outside without the rotation and transmit a signal.

In addition, the power for operating the load cell 130 and the board 121 may be received from the outside by either a brush using direct contact or a wireless power transmission.

In addition, a signal detected from the load cell 130 and the board 121 may be received from the outside by either a brush using direct contact or a wireless power transmission.

Hereinafter, the power transmission apparatus capable of measuring the torque according to the exemplary embodiment of the present invention and a power generation apparatus 200 using the same will be described with reference to FIGS. 1 to 5, and the power transmission apparatus 100 capable of measuring the torque refers to those described above.

The power generation apparatus 200 using the power transmission apparatus capable of measuring the torque according to the exemplary embodiment of the present invention includes a housing 210, a pulley 220, a shaft 230, a drum 240, a motor 250, and a controller 260.

The housing 210 is mounted on one side of the power transmission apparatus 100 capable of measuring the torque (hereinafter, referred to as "the power transmission apparatus") and may be formed by a box-shaped frame.

The pulley 220 is connected to the outer circumference surface of the outer body 110 of the power transmission apparatus 100 by a timing belt 221 and mounted on the other side of the housing 210. Such a pulley 220 has a diameter smaller than the diameter of the outer body 110 and transmits the torque to the outer body 110 through the timing belt 221. That is, the power transmission apparatus 100 rotates by the rotation of the pulley 220.

One side of the shaft 230 is coupled to a central axis of the inner body 120 of the power transmission apparatus 100. Referring to FIGS. 1 and 5, one side of the shaft 230 is coupled to the central axis of the inner body 120 to have a rod shape extending in a longitudinal direction.

The shaft 230 may rotate in the same direction by the rotation of the inner body 120.

The drum 240 is coupled to the other side of the shaft 230 and includes either a flat belt 241 or a cable which is connected to the outer circumference surface of the drum 240 so as to convert the rotational motion of the shaft 230 into a straight-line motion.

The flat belt 241 may be connected to the outer circumference surface of the drum 240 so as to convert the rotational motion of the shaft 230 into a straight-line motion. That is, the drum 240 may be used for winding the belt or the cable capable of converting the torque into a straight force. As described above, the drum 240 is used to change a direction of the straight force to a desired direction.

Meanwhile, one side of the flat belt 241 is connected to the drum 240 and the other side thereof is directly pulled by the user or connected to a mechanical structure, but not connected with the drum 240 to receive the pulling force.

Further, the drum 240 may further include a slip ring 242.

The slip ring 242 is inserted to the inside of the drum 240 and serves to transmit power and a torque sensing signal by a brush method of contacting the rotating shaft 230. It is possible to replace the power transmission method with a wireless power transmission technology, and replace the torque signal transmission method with a wireless data communication method.

The motor 250 is coupled with the pulley 220 to transmit rotational power to the pulley 220. That is, the motor 250 is connected to the central axis of the pulley 220 to rotate the pulley 220. In addition, the motor 250 serves to transmit the rotational power to the outer body connected to the pulley 220 and the timing belt 221.

The controller 260 controls the motor 250 and compares pre-measured torques by feed-backing the measured rotational force in order to generate a desired force by controlling the current of the motor 250.

The aforementioned description of the present invention is to be exemplified, and it can be understood by those skilled in the art that the technical spirit or required features of the present invention can be easily modified in other detailed forms without changing.

Therefore, it should be appreciated that the aforementioned embodiments are all illustrative in all aspects and are not restricted. For example, respective constituent elements described as single types can be distributed and implemented, and similarly, constituent elements described to be distributed can also be implemented in a coupled form.

The scope of the present invention is represented by claims to be described below rather than the detailed description, and it is to be interpreted that the meaning and scope of the claims and all the changes or modified forms derived from the equivalents thereof come within the scope of the present invention.

What is claimed is:

1. A power transmission apparatus capable of measuring torque, comprising:
    an outer body that receives power from outside, the outer body being formed in a teeth shape along an outer circumference surface of the outer body to receive the power from outside and including a space, wherein the space is formed through an inner portion of the outer body and formed as a pair of opposing spatial portions, each spatial portion being defined by an arc of the outer body and two flat surfaces that emanate from the outer body toward a middle portion of the outer body;
    an inner body that is received within the outer body, the inner body including two flat surfaces, each being disposed in a respective spatial portion of the space, wherein each flat surface of the inner body is substantially parallel with a respective flat surface of the flat surfaces that emanate from the outer body; and
    two load cells disposed between the flat surfaces of the inner body and the flat surfaces that emanate from the outer body, each load cell directly abutting one of the flat surfaces of the inner body and one of the flat surfaces that emanate from the outer body so that the inner body and the outer body are connected only by the load cells,
    wherein the inner body is formed so that an outer perimeter surface of the inner body is spaced apart from an inside of the space, and
    wherein the two load cells receive a compression force and a tension force from the outer body and the inner body.

2. The power transmission apparatus of claim 1, wherein the outer body is supported by any one of a sleeve or a bearing in the inner body.

3. The power transmission apparatus of claim 1, wherein the inner body includes a board including an electric circuit for operating the two load cells.

4. The power transmission apparatus of claim 3, wherein power for operating the two load cells and the board is received from outside by either a brush using direct contact or a wireless power transmission.

5. The power transmission apparatus of claim 3, wherein a signal detected from the two load cells and the board is transmitted outside by either a brush using direct contact or a wireless power transmission.

6. A power generation apparatus using a power transmission apparatus capable of measuring torque, the power generation apparatus comprising:
    a housing where the power transmission apparatus capable of measuring the torque according to claim 1 is mounted on a first side thereof;
    a pulley which is connected to an outer circumference surface of the outer body of the power transmission apparatus by a timing belt and mounted on a second side of the housing;
    a shaft, wherein a first side of the shaft is coupled to a central axis of the inner body of the power transmission apparatus;
    a drum coupled to a second side of the shaft;
    a motor connected with the pulley to rotate the pulley; and
    a controller controlling the motor,
    wherein the power transmission apparatus is rotated by a rotation of the pulley.

7. The power generation apparatus of claim 6, wherein the drum includes either a flat belt or a cable connected to an outer circumference surface of the drum so as to convert a rotational motion of the shaft into a straight-line motion.

* * * * *